2,842,445
BINDING LIQUID FOR MOLDS USED IN PRECISION CASTING

Harold Garton Emblem, Melbourne, and Desmond Joseph Cloherty, Chellaston, England, assignors to Rolls-Royce Limited, Derby, England, a British company No Drawing. Application January 23, 1956
Serial No. 560,849

Claims priority, application Great Britain August 18, 1953

9 Claims. (Cl. 106—38.35)

In precision investment casting processes a pattern is invested in a refractory material which may be bound by a bonding agent and then subsequently removed producing a mould in which the metal is cast to obtain a cast article.

In these processes, when moulds of the highest strength are required, the bonding agent for the refractory material is usually prepared from an organic silicate, generally ethyl silicate, by an acid hydrolysis process.

The pattern is commonly made from wax or other low melting expendable material, and is then removed by melting, dissolving in a suitable solvent or by some mechanical process.

We have found that a mould or mould part having increased strength may be produced from a refractory material by using a bonding liquid prepared by carrying out the hydrolysis of ethyl silicate with a stable silica sol, to which hydrochloric or sulphuric acid has been added.

By the expression "a stable silica sol" is meant a stable substantially electrolyte-free colloidal dispersion of silica in water, sometimes referred to as a "silica aquasol." Preferred stable silica sols are those containing at least 15% $SiO_2$ by weight. The ethyl silicate hydrolysis is carried out by the water present in the silica sol. This allows of the preparation of hydrolysed ethyl silicate solutions having a greater silica content than has hitherto been possible. The hydrolysis may be carried out in the presence of a mutual solvent, or by emulsifying the ethyl silicate with the acidified stable silica sol.

As ethyl silicate and water are immiscible the hydrolysis is best carried out in a mutual solvent for ethyl silicate and the water present in the stable silica sol. Examples of suitable mutual solvents are acetone, ethyl alcohol and isopropanol alcohol. Of these solvents, ethyl alcohol and isopropanol are preferred.

The degree of acidification of the stable silica sol controls the rate of hydrolysis of the ethyl silicate, and also the time of gelation of the resulting hydrolysed ethyl silicate solution. If the reaction is to be carried out in the presence of a mutual solvent, e. g. ethyl alcohol or isopropanol alcohol, for ethyl silicate and the stable silica sol, it is essential that the stable silica sol should be acidified before adding the solvent, to prevent uncontrollable gelation of the sol. In order to dilute the sol as little as possible, it is desirable to acidify the sol by adding concentrated acid. If the acid to be used is hydrochloric acid, one suitable acid is a commercial concentrated hydrochloric acid solution, having a specific gravity of not less than 1.12 corresponding to a normality of 7.3. A preferred hydrochloric acid solution is one having a specific gravity between 1.14 and 1.18, corresponding to a normality of between 8.8 and 11.8. Sulphuric acid solutions of the same normality range are also suitable. Preferably the normality of the acidified silica sol is in the range 0.25–1.2 to obtain a desired time of gelation. The figures in this range of normality are obtained by adding the acid to the silica sol and titrating with standard alkali using methyl orange as an indicator.

It will be realised that the minimum amount of acid required to be added to the silica sol is that which is just sufficient to make the sol acid, but in this case, the hydrolysis reaction is inconveniently slow. If large amounts of acid are added, and the hydrolysis reaction carried out, the resulting hydrolysed ethyl silicate solution has a gel time too short to be of practical value in the investment casting process, where the mould is prepared by investing an expendable pattern with a slurry comprising a powdered refractory material and a binding liquid.

The ethyl silicate which may be used may for example be tetra-ethoxy silane $(Si(OC_2H_5)_4)$, or the product obtained by reacting silicon tetrachloride with 64 over proof ethyl alcohol as described in British patent specification No. 290,717. The latter product contains approximately 40 percent by weight of silica and is thus preferred to the former which has a silica content of approximately 28 percent by weight.

Another preferred ethyl silicate is that described in British patent specification No. 674,137. This ethyl silicate has a composition such that on distilling at atmospheric pressure without any substantial reflux, 8–16% of it by volume distils up to 180° C., and 39–55 percent above 180° C.

In general the preferred ethyl silicates are those which have a silica content of at least 40% by weight; in carrying out the process the ethyl silicate may be emulsified with the silica sol to which acid has been added.

The stable silica sol may be prepared by reacting a water soluble inorganic silicate such as sodium silicate with an ion-exchange resin in known manner. The resulting solution may be concentrated to a silica concentration of at least 30 percent.

Other methods of preparing these silica sols are known and may be employed.

Typical silica sols which may be used in carrying out this invention are sold under the British registered trademark "Syton" and have the following properties:

Silica sol. No. 1:
  Silica content_____ 15 percent by weight.
  pH_____ 10.0.
  Average particle diameter___ 1500° A.
  Sold as "Syton C."

Silica sol. No. 2:
  Silica content_____ 30 percent by weight.
  pH_____ 10.0.
  Average particle diameter___ 250° A.
  Sold as "Syton 2X."

A suitable ethyl silicate is that sold under the British registered trademark "Silester" as Silester "O."

Silester O is an ethyl silicate prepared by the reaction of silicon tetrachloride and 64 over proof ethyl alcohol. It has a typical analysis as follows, all percentages being by weight:

Specific gravity 1.05 to 1.07 at 20° C.
Acidity as percent HCl—0.1% maximum.
Percent excess ethyl alcohol—4% maximum.
Silica content as percent $SiO_2$—40–43%.

Suitable refractory materials to use with bonding liquids according to this invention to form a mould are silica, the aluminum silicates such as sillimanite, calcined kaolin, fireclay grog together with zircon and zirconia. In the materials the lime, magnesia and alkali content should not exceed 4 percent by weight.

It will be realised that other refractory materials may be used in addition to those listed provided that they have not an excessive alkali content.

The following are examples given by way of illustration of ways of preparing bonding liquids according to this invention:

EXAMPLE 1

84 cc. of ethyl silicate (Silester "O") were added to a solution comprising 26 cc. of Syton "C" (silica sol No. 1) mixed with 2 cc. of commercial concentrated hydrochloric acid solution and 35 cc. of 64 O. P. ethyl alcohol. One hour after mixing, a further 58 cc. of ethyl silicate (Silester "O") were added, the solution being ready for use at this stage.

EXAMPLE 2

2 cc. of commercial concentrated hydrochloric acid solution were added to 26 cc. of Syton 2X (silica sol No. 2). 35 cc. of 64 O. P. ethyl alcohol were next added followed by 84 cc. of ethyl silicate (Silester "O"). 30 minutes later 47 cc. of ethyl silicate (Silester "O") were added, the solution being ready for use at this stage. It is essential to add the components in the order given.

EXAMPLE 3

50 cc. of commercial concentrated hydrochloric acid solution were added to 1300 cc. of Syton 2X (silica sol No. 2). 3500 cc. of 64 O. P. ethyl alcohol were next added followed by 8400 cc. of ethyl silicate (Silester "O"). One hour later 6700 cc. of ethyl silicate (Silester "O") were added, the solution being ready for use at this stage. It is essential to add the components in the order given and approximately at the times scheduled.

The mould investment slurry using this liquid binder may be prepared in the following manner:

2 cwts. of a refractory filler containing approximately equal parts by weight of zircon sand and calcined kaolin were added to all the bonding liquid prepared in accordance with Example No. 3 half an hour after the preparation of that liquid was completed. The refractory filler had the following chemical analysis and particle size distribution:

A. *Chemical analysis*

| | Percent by weight |
|---|---|
| $ZrO_2$ | 39.61 |
| $Al_2O_3$ | 18.43 |
| $SiO_2$ | 41.42 |
| $Fe_2O_3$ | 0.10 |
| $TiO_2$ | 0.22 |
| Alkali | 1.23 |

B. *Particle size analysis*

| B. S. 410, 1943, Sieve No.: | Percentage retained |
|---|---|
| 12 | |
| 16 | 0.5 |
| 22 | 8.0 |
| 30 | 13.4 |
| 36 | 4.4 |
| 44 | 3.2 |
| 60 | 5.4 |
| 72 | 1.8 |
| 100 | 6.8 |
| 120 | 13.5 |
| 150 | 10.3 |
| 200 | 13.5 |
| Past 200 | 19.1 |

The mould is formed by vibration of the invested pattern to consolidate the refractory in the slurry.

EXAMPLE 4

To 9,000 cc. of Syton 2X (silica sol No. 2) were added 600 cc. of concentrated hydrochloric acid, followed by 15,000 cc. of 64 O. P. ethyl alcohol. 60,000 cc. of ethyl silicate (Silester O) were added to the mixture, which was stirred for 1 hour before use. It is essential to add the reagents in the order given.

An investment slurry was prepared by mixing 14 litres of the above solution with 112 lbs. of the refractory filler used in Example 3. This gives a rather stiff slurry. A more fluid slurry may be prepared by using 15 litres of the solution.

After vibration of the invested patterns the resulting moulds are heated at a temperature between 35° C. and 40° C. for 4 days, to gel the bonding liquid. The mould is then heated at a temperature between 95° C. and 100° C. for at least 24 hours, to remove the wax pattern, then gradually heated to a temperature of approximately 1000° C. over a period of 8 hours, being held at approximately 1,000° C. for at least two hours, and preferably for not less than 10 hours, prior to the casting operation.

EXAMPLE 5

To 4,400 cc. of Syton 2X (silica sol No. 2) were added 400 cc. of concentrated hydrochloric acid, followed by 7,500 cc. of 64 O. P. ethyl alcohol. 30,000 cc. of ethyl silicate (Silester O) were added to the mixture, which was stirred for three hours before use. It is essential to add the reagents in the order given.

An investment slurry was prepared by mixing 20.5 litres of the above solution with 112 lbs. of the refractory filler used in Example 3. This gives a fluid slurry, gelling in approximately 48 hours.

After vibration of the invested patterns the resulting moulds are allowed to stand at normal room temperature for 48 hours, then heated to a temperature between 95° C. and 100° C. for at least 24 hours to remove the wax pattern. The moulds are then gradually heated to a temperature of approximately 1,000° C. over a period of 8 hours, being held at approximately 1,000° C. for at least two hours, and preferably for not less than ten hours, prior to the casting operation.

EXAMPLE 6

To 6,750 cc. of Syton 2X (silica sol No. 2) were added 300 cc. of concentrated hydrochloric acid, followed by 11,000 cc. of 64 O. P. ethyl alcohol. 45,000 cc. of ethyl silicate (Silester O) were added to the above mixture, which was stirred for three hours before use. It is essential to add the reagents in the order given.

An investment slurry was prepared by mixing 21 litres of the above solution with 112 lbs. of fireclay grog, having an alumina percentage of 44, and a particle size distribution as given below.

| B. S. S. 410, 1943, sieve No.: | Percent retained |
|---|---|
| 16 | 2.1 |
| 30 | 23.3 |
| 52 | 19.1 |
| 72 | 10.0 |
| 100 | 7.4 |
| 150 | 9.3 |
| 200 | 6.4 |
| Pass 200 | 22.2 |

After vibration of the invested patterns, the resulting moulds are treated as described in Example 4.

EXAMPLE 7

To 30 cc. of Syton 2X were added 2 cc. of a sulphuric acid solution prepared by the dilution with water of concentrated sulphuric acid of specific gravity 1.84, so that 15 cc. of the concentrated sulphuric acid were contained in 50 cc. of the diluted acid solution. This diluted sulphuric acid has a normality of 11.3. 50 cc. of anhydrous isopropanol were now added to the acidified Syton 2X, followed by 200 cc. of ethyl silicate (Silester O). The mixture is ready for use one hour after the addition of the ethyl silicate during which time the hydrolysis reaction takes place.

It is essential to add the reagents in the order given and to stir the mixture vigorously as the reagents are added, especially during the addition of the sulphuric acid solution and the ethyl silicate.

The hydrolysed ethyl silicate solution is miscible with acetone, benzene and ethyl silicate and may be gelled by an aqueous solution of ammonium carbonate. 5 mls. of a solution of 8 gms. of ammonium carbonate, B. P. grade, in 100 mls. of water were found to gel 50 cc. of the above hydrolysed ethyl silicate solution in about 3 minutes.

EXAMPLE 8

To 25 cc. of Syton 2X were added 2 cc. of concentrated hydrochloric acid solution, followed by 125 cc. of ethyl silicate (Silester O). The mixture was stirred vigorously during the addition of the reagents and while the hydrolysis reaction proceeded. When the temperature of the mixture began to fall a further 150 cc. of ethyl silicate (Silester O) were added. The solution is ready for use when cold.

In the above Examples 1 to 6 and 8 the concentrated hydrochloric acid or commercial concentrated hydrochloric acid solution used is one having a specific gravity in the range 1.14 to 1.18 and best results are achieved with the latter value. Instead of using a concentrated hydrochloric acid solution in these examples a sulphuric acid solution of the same normality may be used with equally good results.

By the use of binding liquids according to this invention we have been able to construct investment moulds of considerably increased strength to those known to us hitherto. This advantage has permitted inter alia the production of the long slender cores used in the production of certain hollow castings, for example hollow turbine stationary blades of gas turbine engines.

This application is a continuation-in-part of our application Serial No. 444,363, filed July 19, 1954, now abandoned.

What we claim is:

1. A bonding liquid for bonding refractory materials used for moulds and cores in precision casting which is prepared by carrying out the hydrolysis of ethyl silicate with a stable silica sol to which has been added an acid selected from the group which includes hydrochloric and sulphuric acids to produce a normality of the acidified silica sol in the range 0.25 to 1.2.

2. A bonding liquid as claimed in claim 1 in which the hydrolysis of ethyl silicate is carried out in a mutual solvent for ethyl silicate and water present in the stable silica sol.

3. A bonding liquid as claimed in claim 2 in which the mutual solvent is chosen from the group acetone, ethyl alcohol and isopropanol.

4. A bonding liquid as claimed in claim 1 in which the added acid is a concentrated hydrochloric acid solution having a specific gravity of not less than 1.12.

5. A bonding liquid as claimed in claim 3 in which the added acid is hydrochloric having a specific gravity of from 1.14 to 1.18.

6. A bonding liquid as claimed in claim 1 in which the added acid is a high concentration of sulphuric acid having a normality not less than 7.3.

7. A bonding liquid as claimed in claim 1 in which the added acid is sulphuric acid having a normality between 8.8 and 11.8.

8. A bonding liquid as claimed in claim 1 in which the stable silica sol contains at least 15 percent of $SiO_2$ by weight.

9. A bonding liquid as claimed in claim 1 in which the ethyl silicate has been emulsified by the silica sol to which the acid has been added.

References Cited in the file of this patent

UNITED STATES PATENTS

| | | |
|---|---|---|
| 2,524,358 | Robey | Oct. 3, 1950 |
| 2,701,902 | Strachan | Feb. 15, 1955 |

FOREIGN PATENTS

| | | |
|---|---|---|
| 722,425 | Great Britain | Jan. 26, 1955 |

OTHER REFERENCES

Iler: "The Colloid Chemistry of Silicat Silicates," published by Cornell Univ. Press (1955), pages 45, 48, 49, 55.